US005503691A

United States Patent [19]
Wolff et al.

[11] Patent Number: 5,503,691
[45] Date of Patent: Apr. 2, 1996

[54] THE AESTHETIC ENHANCEMENT OR MODIFICATION OF ARTICLES OR COMPONENTS MADE OF NON-FERROUS METALS

[75] Inventors: Ira M. Wolff; Michael B. Cortie, both of Randburg, South Africa

[73] Assignee: Mintek, Randburg, South Africa

[21] Appl. No.: 348,746

[22] Filed: Dec. 1, 1994

Related U.S. Application Data

[63] Continuation of Ser. No. 57,995, May 5, 1993, abandoned.

[30] Foreign Application Priority Data

May 6, 1992 [ZA] South Africa ............... 92/3276

[51] Int. Cl.⁶ .................. C22F 1/08; C22F 1/14
[52] U.S. Cl. ............ 148/563; 148/678; 148/680; 148/684; 148/686
[58] Field of Search ................. 148/563, 678, 148/680, 684, 686

[56] References Cited

U.S. PATENT DOCUMENTS

Re. 31,474  12/1983  Brook et al. ............... 148/563
3,141,799   7/1964   Brellier ..................... 148/557

FOREIGN PATENT DOCUMENTS

| 0313070 | 4/1989 | European Pat. Off. |
| 2589167 | 4/1987 | France. |
| 58-048649 | 3/1983 | Japan. |
| 60-110885 | 6/1985 | Japan. |
| 60-149763 | 8/1985 | Japan. |
| 61-034164 | 2/1986 | Japan. |
| 2-258960 | 10/1990 | Japan ............ 148/563 |
| 2-267237 | 11/1990 | Japan. |
| 3-170650 | 7/1991 | Japan ............ 148/563 |

Primary Examiner—Scott Kastler
Assistant Examiner—Sikyin Ip
Attorney, Agent, or Firm—Marshall, O'Toole, Gerstein, Murray & Borun

[57] ABSTRACT

A method of enhancing the appearance of a polished surface of an artifact is provided in which the artifact is formed from a non-ferrous alloy, in particular, but not exclusively, a precious metal alloy, chosen to exhibit a martensitic and a parent phase structure. The surface, or relevant part thereof, is polished in one of the phases, usually the parent phase, followed by heat treatment to effect a phase transformation, generally to the martensitic phase. This phase change causes a visible surface effect to the polished surface which may be described as a spangle effect.

11 Claims, 5 Drawing Sheets

THE AESTHETIC ENHANCEMENT OR MODIFICATION OF ARTICLES OR COMPONENTS MADE OF NON-FERROUS METALS

This is a continuation of U.S. application Ser. No. 08/057,995, filed May 5, 1993, now abandoned.

FIELD OF THE INVENTION

This invention relates to the aesthetic enhancement of the surface of articles or components thereof made of non-ferrous metals and, more particularly, non-ferrous metals the composition of which is chosen to exhibit a martensitic phase transformation on the application of suitable thermal treatment to the article or component.

Within the range of alloys with which this invention is concerned are numerous alloys based on different metals such as copper, and more particularly, and more importantly, gold, silver and the platinum group metals.

Still more particularly, but not exclusively, the invention is concerned with modifying the surface appearance of such articles as items of jewellery, coinage, ornaments, and any other articles having an aesthetic appeal.

BACKGROUND TO THE INVENTION

Non-ferrous metal articles, in particular items of jewellery, coins, ornaments and the like, and more particularly such articles made of precious metals such as gold, platinum and silver, have surfaces, or components with surfaces, which are either highly polished, frosted, or provided with physical relief patterns applied by stamping, forging, moulding, or engraving. The processes whereby ornamentation or aesthetic appeal may be applied to the surface of such articles is therefore limited and it is considered that it would be highly desirable to provide an alternative to these well known basic surface finishes.

It is, accordingly, the object of this invention to provide articles or components thereof made of non-ferrous alloys, in particular but not exclusively, precious metal alloys, which have a novel and aesthetically pleasing surface appearance.

SUMMARY OF THE INVENTION

In accordance with one aspect of this invention there is provided a method of producing an article, or a component thereof, wherein the article is made of a non-ferrous alloy having a composition chosen to exhibit martensitic phase transformations between a parent phase and a martensitic phase, the method comprising the steps of producing the article or component, polishing all or a required part of the surface thereof, and subsequently heat treating the article or component to cause a martensitic phase transformation to occur at least at said polished surface to cause a visible surface effect to be created.

The article may be produced, and initially polished, in the parent phase, followed by heat treatment to effect phase conversion to the martensitic phase of at least the polished surface. Alternatively, or additionally, the surface may be polished in the martensitic phase followed by heat treatment to transform the alloy back to the parent phase to produce a reverse surface effect.

Further features of the invention provide for the alloy to be based on copper, gold, silver or the platinum group metals; for the thermal treatment to be effected by heating the article or component to a temperature within the parent phase field on the equilibrium phase diagram followed by rapid cooling to below the martensite start transformation temperature, and, if required, by additional refrigeration treatment such as by immersing the article or component in liquid nitrogen; in the case where the alloy oxidises at elevated temperature, for the surface to be polished or buffed at a temperature intermediate the high and low temperatures of the thermal treatment; and, if required, to develop more ductility, for the article or component to be heat treated at a temperature outside the beta phase field prior to working or forming, and then inducing the martensitic phase change.

A further feature of the invention allows certain alloys to be thermally treated or aged to prevent the martensitic transformation.

A further feature of the invention allows the martensitic phase, or parent phase, as may be required, to be stabilised by ageing for prolonged periods.

A further feature of the invention allows the intrinsic colour of certain alloys to be modified, and more particularly, allows certain alloys based on gold to be produced exhibiting a range of colours. Still more particularly, the intrinsic colour of alloys of at least 18 carats based on the gold-copper-aluminium system, can be modified from yellow, through red through purple through white, by varying the aluminium content.

Still further features of the invention provide for ternary or higher alloy additions to be embodied in the non-ferrous metal alloy to thereby modify the mechanical properties, the colour, or the temperature range over which the martensitic transformation occurs, or a combination of these aspects; for the coarseness of the resultant surface effect of the martensitic phase change to be refined by either inoculations of the melt, or suitable thermo-mechanical processing of the compound prior to the thermal treatment to produce the martensitic phase change; and for additional colour effect or the prominence of the surface effect to be enhanced by chemical or electrolytic etching of the surface, or by reaction of the surface with, or diffusion into the surface of, or deposition on, the surface of chemically reactive species and/or coatings.

It is interesting to note that the modified surface, or as it may be termed "spangle" produced in consequence of the martensitic phase change, can be removed by mechanical polishing, buffing or even by re-heat-treating the article or component and cooling at a rate slow enough to allow diffusion in cases where shape memory properties exist.

It is also of interest that the spangle created by the martensitic phase change on each and every surface will be unique and, accordingly, each article or component will be "finger-printed".

A more detailed description of the invention, and some examples thereof will now follow with reference being made to the accompanying drawings.

DETAILED DESCRIPTION OF THE INVENTION AND EXAMPLES THEREOF

A relatively small number of metallic alloys exhibit the phenomenon known as martensitic phase transformation. In its simplest form, a martensitic phase transformation may be considered to be a displacive solid state transformation, without diffusion, and consisting of a change in the crystallographic structure. On a microstructural scale, the martensite phase appears as packets of lenticular laths, plates, or twins. The martensitic transformation in non-ferrous alloys can also give rise to several associated effects such as thermo-elasticity, pseudo-elasticity, electric resistivity anomalies, damping, rubber-like behaviour, and the one or two-way shape memory effect.

Figure 1:
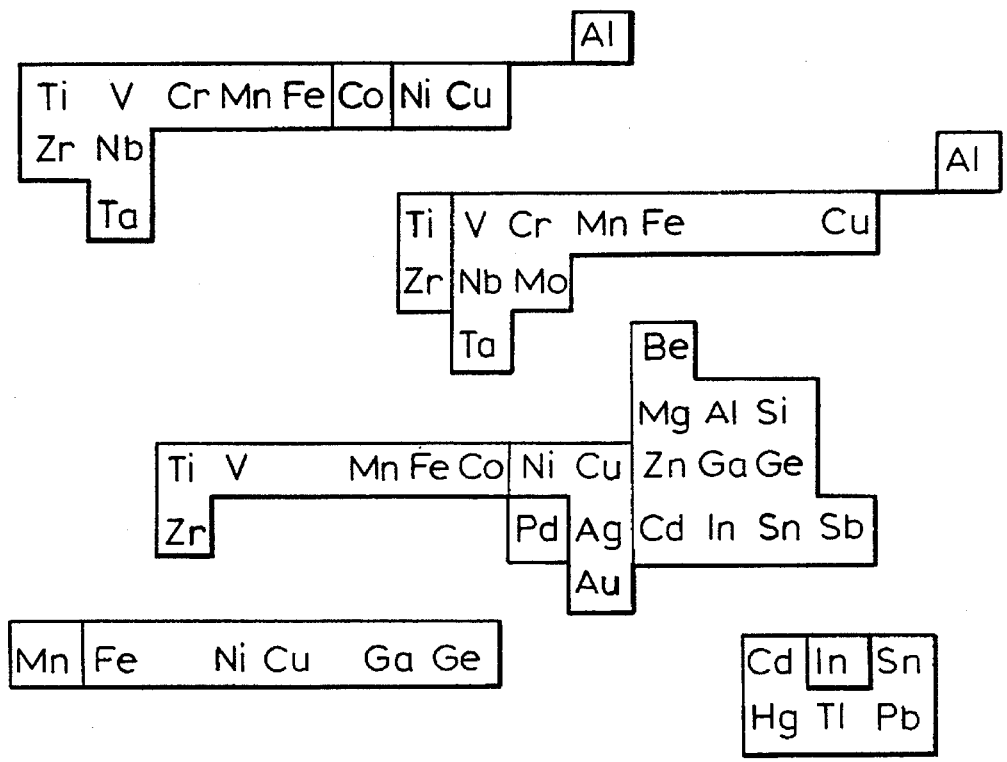
FIG. 1 is an abbreviated periodic table showing the base elements (in bold) with which the adjacent alloying elements may be expected to exhibit a martensitic transformation.
Figure 2A:
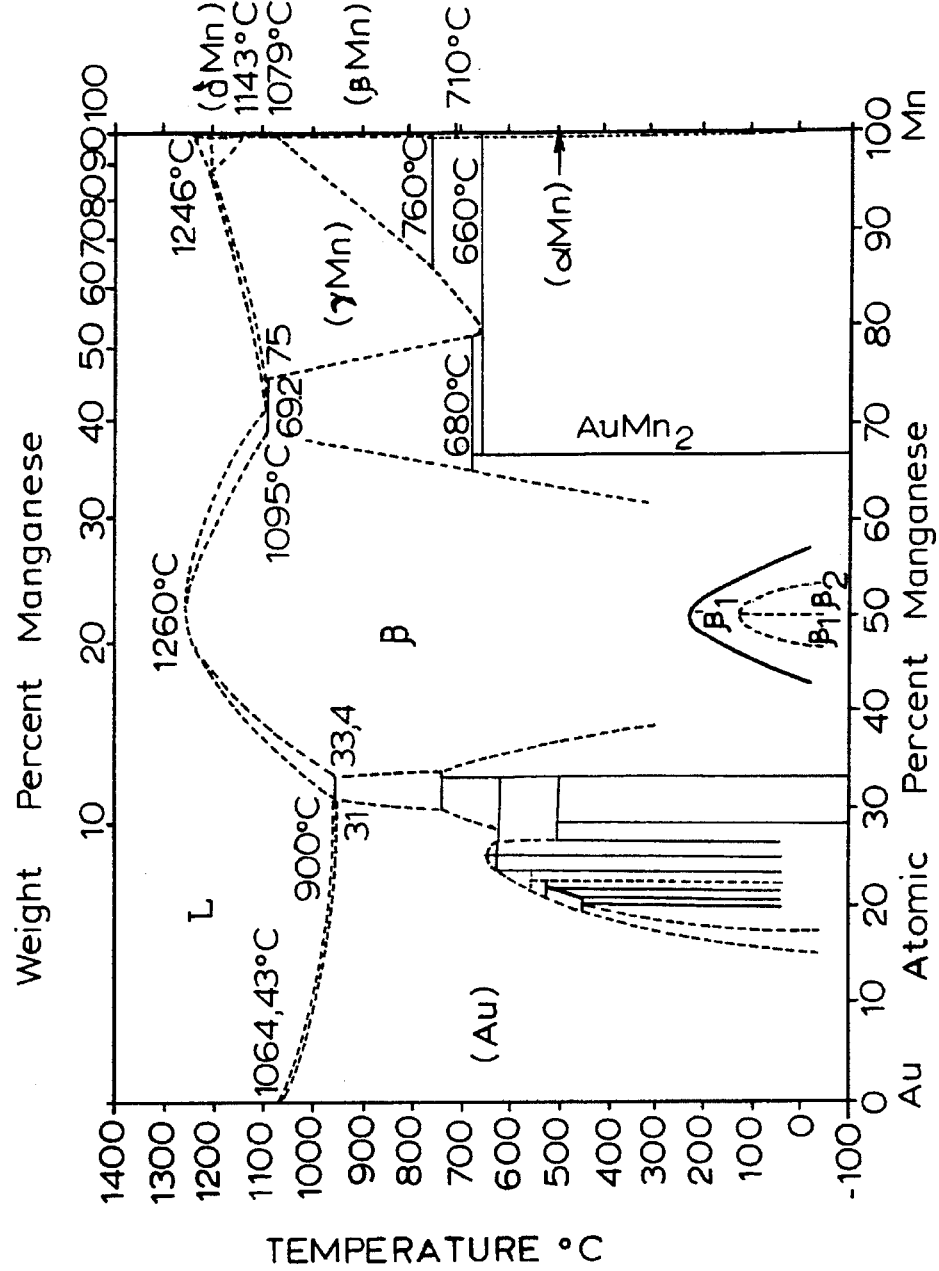
FIGS. 2A and 2B are typical equilibrium phase diagrams of alloys exhibiting martensitic transformation characteristics.
Figure 2B:
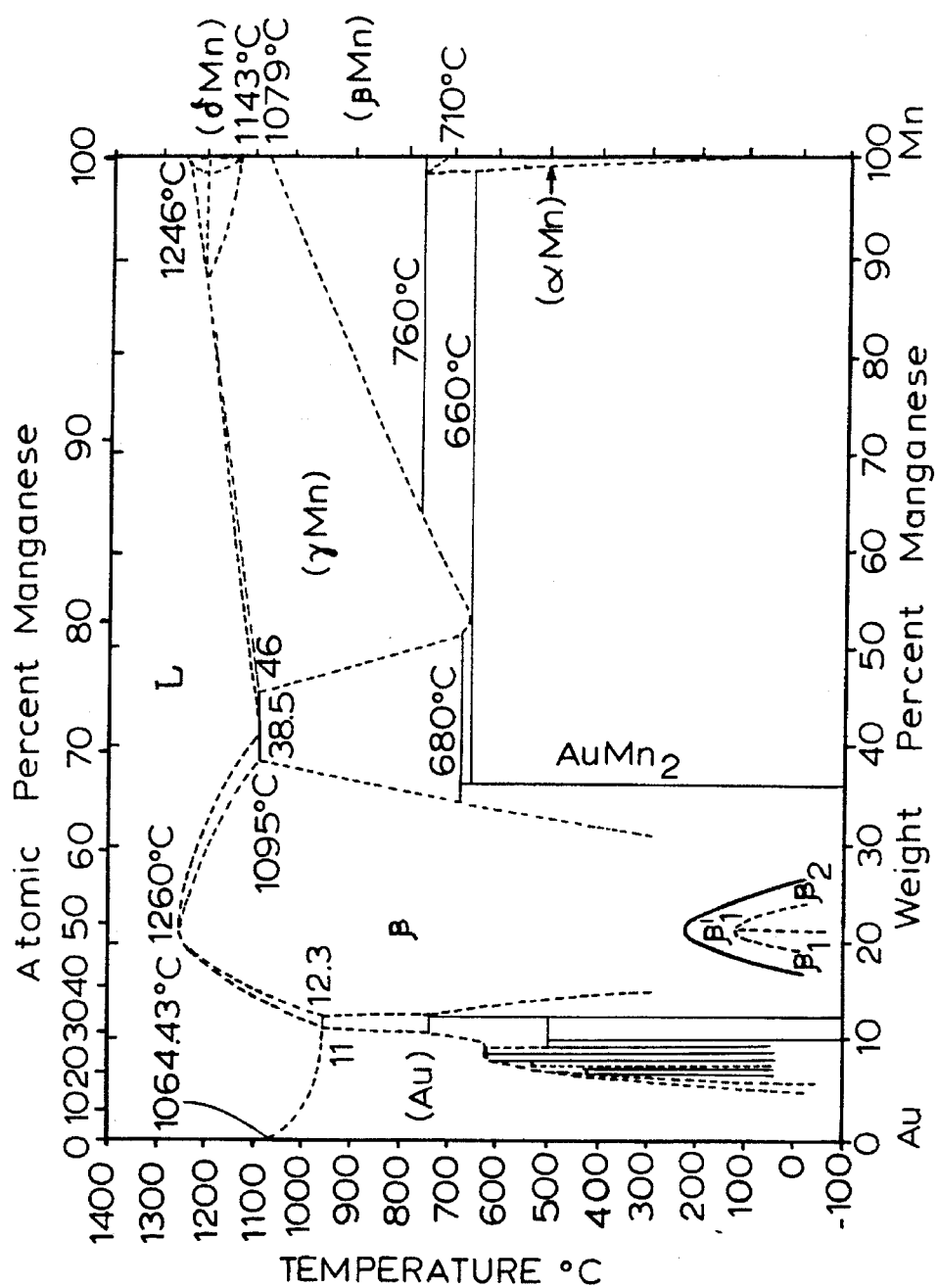
Figure 3:
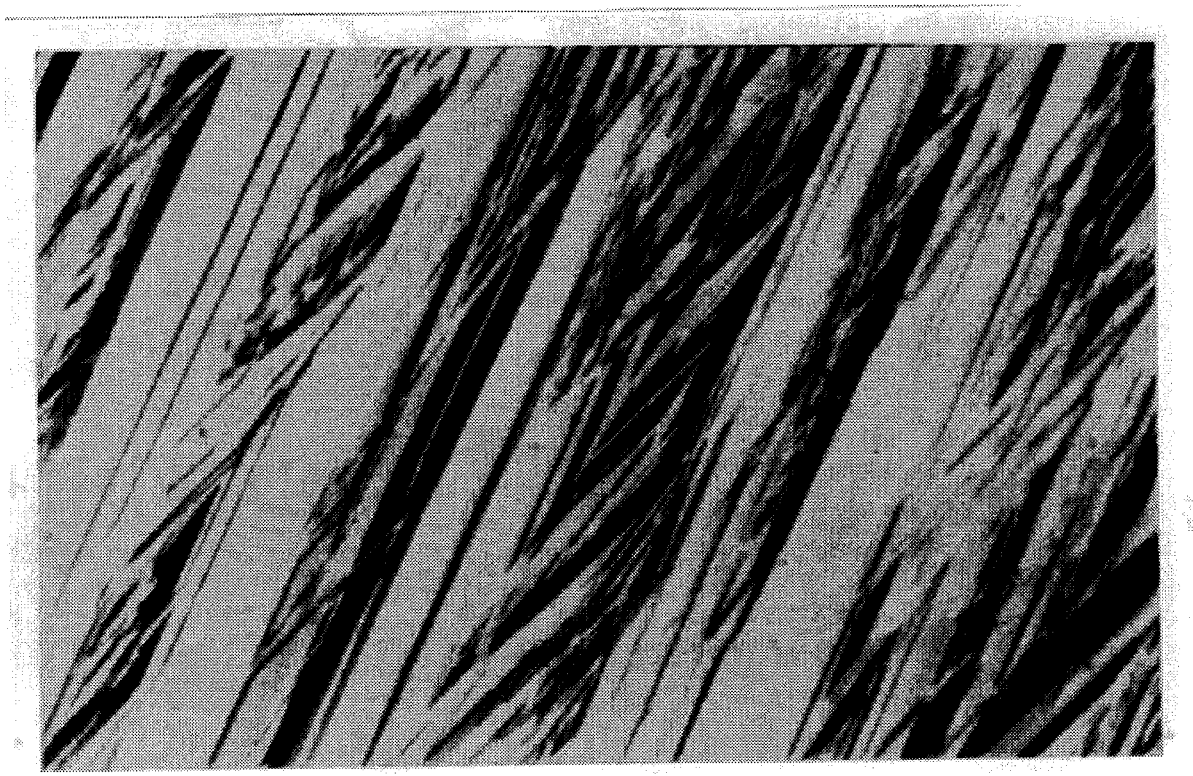
FIG. 3 is an optical micrograph taken under polarised light showing the martensitic structure in a Cu—Zu—Al alloy; and, FIG. 4 illustrates a martensite structure in a Pt—Ti alloy.
Figure 4:

The equilibrium phase diagrams of alloys of Copper (Cu), Silver (Ag), Gold (Au) and the platinum group metals (PGMs) in particular with metals of the B sub-group of the periodic table, show a fair degree of similarity and display a characteristic V-shape parent "beta" phase field. A typical phase diagram is illustrated in FIG. 2 which illustrates the Au—Mn system, showing a characteristic parent beta ($\beta$) phase filed with B2 structure. The $\beta_1$ and $\beta_2$ transitions correspond to martensitic transformations. A summary of some of the binary alloys in this group that may be expected to exhibit a martensitic phase transformation is shown schematically in the abbreviated periodic table in FIG. 1. The elements in the bold frames represent the base elements in association with which the adjoining elements may be expected to yield the required transformation characteristics. Various other precious metal and ternary compounds have also been identified in the literature as exhibiting martensitic transformations, such martensitic alloy systems include those based on the platinum group metals Pt, Pd, Ru, Rh, Ir, and Os.

The characteristics of the martensitic transformation and related effects in intermetallic solid solutions are documented in a large body of literature, and although certain issues remain to be clarified, rigorous studies have led to the controlling mechanisms being largely understood.

A variety of compounds have been made, for example, by vacuum arc or vacuum induction melting, or melting in sealed quartz containers. The compositions have been selected to vary the martensite transformation temperature, and the compounds have been heat treated to exhibit the martensitic transformation. Some of the compounds have been shown to be workable, for example by wire-rolling, or cold or hot rolling. In addition, selected artifacts have been fabricated to illustrate the application of the martensitic transformation for decorative purposes.

Examples of compounds based on the Cu, Ag, Au and Pt systems have been manufactured. Specifically, martensitic spangle was produced in the following compositions (by weight) using the techniques previously indicated.

Cu-27% Zn-4% Al
Cu-26% Zn-4% Al
Cu-23.6% Sn
Pt-21% Ti
Pt-19% Ti
Pt-9% Al-10% Cu
Pt-9.5% Al-5% Cu
Au-22% Cu-31% Zn
Au-(0–22% Cu)-(2–8% Al)

A further selection of compositions which may be expected to exhibit the martensitic transformation are currently under investigation; (Figures in parentheses give the expected composition ranges for the martensitic transformation of interest):

| | |
|---|---|
| Au—Al | (96–98% Au; bal. Al) |
| Au—Cu—Zn | (69–83% Au; 17–31% Zn; 0–22% Cu) |
| Au—Mn | (61–88% Au; bal. Mn) |
| Au—Ti | (71–82% Au; bal. Ti) |
| Au—Cu—Mn | (61–88% Au; 12–39% Mn; 0–22% Cu) |
| Au—Cu—Ti | (71–82% Au; 18–29% Ti; 0–22% Cu) |
| Au—Mn—Ti | (64–88% Au; 12–36% Mn; 0–22% Ti) |
| Au—Zn | (69–83% Au; bal. Zn) |
| Au—Mn—Zn | (61–88% Au; 12–39% Mn; 17–31% Zn) |
| Pt—Al | (88–91% Pt; bal. Al) |
| Pt—Al—Cu | (9–12% Al; 0–10% Cu; bal. Pt) |
| Pt—Mn | (63–86% Pt; bal. Mn) |
| Pt—Mo | (60–70% Pt; bal. Mo) |

Based on the above results, the concept of this invention has been shown to be applicable to a variety of alloy systems, and over a range of compositions.

It will therefore be understood that numerous different alloys having different colours and compositions can be manufactured such that they exhibit the required martensitic phase change to provide the attractive spangled effect to a polished surface of an article or component thereof.

The surface effect is not only produced when a parent phase is transformed to the martensitic phase but also in the opposite transformation. The surface, or part thereof, may be polished when the alloy is in the martensitic phase and then heat treated to restore the parent phase. This will, similarly, give a surface effect giving an aesthetically pleasing appearance.

What we claim as new and desire to secure by Letters Patent is:

1. A method of producing an article selected from the group consisting of jewelry, coins and ornaments having a surface intended to provide aesthetic appeal, or a component thereof, wherein the article is made of a non-ferrous alloy based on a metal selected from the group consisting of Cu, Au, Ag, Pt, Pd, Ru, Rh, Ir, and Os having a composition chosen to exhibit martensitic phase transformations between a parent phase and a martensitic phase, the method comprising the steps of producing the article or component, polishing all or a required part of the surface thereof, and subsequently heat treating the article or component to cause a martensitic phase transformation to occur at least at said polished surface to cause a visible surface effect to be created which is characteristic of a martensitic phase transformation and consequent on a change in crystallographic structure.

2. A method as claimed in claim 1 in which the article is initially produced in the parent phase.

3. A method as claimed in claim 1 in which the surface or part thereof is polished with the alloy in the parent phase followed by heat treatment to form the martensitic phase at least at said polished surface.

4. A method as claimed in claim 1 in which the phase transformation from the parent phase to the martensitic phase is effected by heating the article or component to a temperature within the parent phase followed by rapid cooling to below the martensitic start transformation temperature.

5. A method as claimed in claim 4 in which the article or component is subjected to additional refrigeration treatment following said rapid cooling.

6. A method as claimed in claim 1 in which polishing of the said surface or part thereof is carried out with the alloy in the martensitic phase at least at said surface and the article or component is thereafter heat treated to transform said martensitic phase back to the parent phase.

7. A method as claimed in claim 6 in which phase transformation from the martensitic phase to the parent phase is carried out by heating to a temperature above the martensitic transformation temperature, ageing at an elevated temperature to stabilize the parent phase, and cooling to ambient temperature.

8. A method as claimed in claim 1 in which the alloy oxidizes at elevated temperature and the said surface or part thereof is polished or buffed at a temperature between high and low temperatures during the heat treating of the article or component.

9. A method as claimed in claim 1 in which, preparatory to working or forming the article or component, it is heated in its parent phase at a temperature outside the parent phase field and is thereafter heat treated to effect the martensitic phase transformation.

10. A method as claimed in claim 1 in which a final martensitic phase is stabilized by ageing for prolonged periods.

11. A method as claimed in claim 1 in which the prominence of the surface effect is enhanced by chemical or electrolyte etching of the surface, or by treating the surface with reactive species or coatings to cause reactions, diffusion or deposition of materials relative to such surface.

* * * * *

UNITED STATES PATENT AND TRADEMARK OFFICE
CERTIFICATE OF CORRECTION

PATENT NO. : 5,503,691

DATED : April 2, 1996

INVENTOR(S) : Wolff et al.

It is certified that error appears in the above-identified patent and that said Letters Patent is hereby corrected as shown below:

Column 2, line 66, "Cu-Zu-Al" should be -- Cu-Zn-Al --.

Signed and Sealed this

Twentieth Day of August, 1996

Attest:

BRUCE LEHMAN

*Attesting Officer*      *Commissioner of Patents and Trademarks*